(12) United States Patent
Mason et al.

(10) Patent No.: US 9,461,922 B2
(45) Date of Patent: Oct. 4, 2016

(54) SYSTEMS AND METHODS FOR DISTRIBUTING NETWORK TRAFFIC BETWEEN SERVERS BASED ON ELEMENTS IN CLIENT PACKETS

(71) Applicant: AOL Inc., Dulles, VA (US)

(72) Inventors: Kevin E. Mason, Ashburn, VA (US); Scott T. Wilson, Front Royal, VA (US); David B. Israel, Sterling, VA (US); Michael V. Harding, Los Angeles, CA (US)

(73) Assignee: AOL Inc., Dulles, VA (US)

( * ) Notice: Subject to any disclaimer, the term of this patent is extended or adjusted under 35 U.S.C. 154(b) by 467 days.

(21) Appl. No.: 14/026,477

(22) Filed: Sep. 13, 2013

(65) Prior Publication Data
US 2015/0081762 A1    Mar. 19, 2015

(51) Int. Cl.
| | |
|---|---|
| *G06F 15/16* | (2006.01) |
| *H04L 12/819* | (2013.01) |
| *H04L 12/721* | (2013.01) |
| *H04L 29/08* | (2006.01) |

(52) U.S. Cl.
CPC .............. *H04L 47/21* (2013.01); *H04L 45/72* (2013.01); *H04L 67/1023* (2013.01)

(58) Field of Classification Search
None
See application file for complete search history.

(56) References Cited

U.S. PATENT DOCUMENTS

| | | | | |
|---|---|---|---|---|
| 2005/0005006 A1* | 1/2005 | Chauffour | ........... | H04L 67/1027 709/223 |
| 2009/0279439 A1* | 11/2009 | Elliott | ................ | H04L 67/1097 370/241 |
| 2010/0265824 A1* | 10/2010 | Chao | ....................... | H04L 12/66 370/235 |
| 2011/0026403 A1* | 2/2011 | Shao | ................... | H04L 67/2895 370/235 |
| 2012/0117228 A1* | 5/2012 | Gabriel | ................... | H04L 47/00 709/224 |
| 2013/0103854 A1* | 4/2013 | Garrett | .................... | H04L 29/06 709/239 |
| 2013/0173756 A1* | 7/2013 | Luna | ................... | H04L 43/0876 709/219 |
| 2013/0227058 A1* | 8/2013 | Drysdale | ................ | H04L 47/70 709/217 |

OTHER PUBLICATIONS

International Search Report and Written Opinion for Application No. PCT/US2014/054952, mailed on Dec. 1, 2014, (10 pages).

* cited by examiner

*Primary Examiner* — Natisha Cox
(74) *Attorney, Agent, or Firm* — Bookoff McAndrews, PLLC (57) ABSTRACT

Systems and methods are disclosed for distributing network traffic received from a plurality of client devices and bound toward a plurality of servers sharing a common network address. One method includes receiving network traffic from the plurality of client devices, addressed to an network address associated the servers; separating the received network traffic into assigned buckets based on a respective source network address associated with each unit of traffic; and forwarding the received traffic to one of a plurality of servers associated with the predetermined network address, based on the bucket assigned. The network traffic may be separated into assigned buckets by determining which subset of bits of an network address of a client device to evaluate for bucket separations. A netmask may be created based on the determined subset of bits, and each source network address may be mapped to one of the buckets using the netmask.

18 Claims, 10 Drawing Sheets

|     | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 404 — ADDRESS: 72.73.30.171 | 0 | 1 | 0 | 0 | 1 | 0 | 0 | 0 | 0 | 1 | 0 | 1 | 0 | 0 | 1 | 0 | 0 | 0 | 0 | 1 | 1 | 1 | 1 | 0 | 1 | 0 | 1 | 0 | 1 | 0 | 1 | 1 |
| 406 — MASK: 8.32.109.34 | 0 | 0 | 0 | 0 | 1 | 0 | 0 | 0 | 0 | 0 | 1 | 0 | 0 | 0 | 0 | 0 | 0 | 1 | 1 | 0 | 1 | 1 | 0 | 1 | 0 | 0 | 1 | 0 | 0 | 0 | 1 | 0 |
| 408 — BUCKET: 8.0.12.34 | 0 | 0 | 0 | 0 | 1 | 0 | 0 | 0 | 0 | 0 | 0 | 0 | 0 | 0 | 0 | 0 | 0 | 0 | 0 | 0 | 1 | 1 | 0 | 0 | 0 | 0 | 1 | 0 | 0 | 0 | 1 | 0 |

SYSTEMS AND METHODS FOR DISTRIBUTING NETWORK TRAFFIC BETWEEN SERVERS BASED ON ELEMENTS IN CLIENT PACKETS

TECHNICAL FIELD

Various embodiments of the present disclosure relate generally to distributing network flows between network connected devices. More specifically, exemplary embodiments of the present disclosure relate to systems and methods for distributing network traffic between servers based on elements in client packets.

BACKGROUND

Companies, universities, governments, and other operators of large-scale network services implement many different types of architectures and methods to balance the burden of network services across their physical hardware resources. For example, these entities have used techniques such as global server load balancing ("GSLB"), route health injection ("RHI"), and/or expensive network device redundancy. Various embodiments of these technologies are sometimes referred to as "high availability," "high reliability," and "load balancing," any of which may typically involve techniques such as round robin DNS (domain name server) routing, scheduling algorithms, etc. All of these technologies are often relatively expensive, in terms of equipment and/or operational complexity, and create a relatively poor user experience when changes or problems occur in one or more network resources or flows.

One useful technique for load balancing or distributing involves a technology referred to as software defined networking ("SDN"). Software defined networking is an approach that allows network administrators to manage network services through abstraction of lower level functionality, such as by decoupling the system that makes traffic control decisions (e.g., the "control plane") from the underlying systems that forwards traffic to the selected destination (e.g., the "data plane"). One mechanism for enabling software defined networking is the Open Flow protocol, which is promoted by the Open Networking Foundation. OpenFlow is a communications protocol that gives access to the forwarding plane of a network switch or router over the network. In other words, OpenFlow allows the path of network packets through the network of switches to be determined programmatically by software using arbitrary criteria. The separation of the control from the forwarding allows for more sophisticated traffic management than is feasible using access control lists (ACLs) and routing protocols. The basic function of OpenFlow is to give external software direct access to program a switch's forwarding table. An OpenFlow switch may talk to a controller, which can send flows that match a set of fields and specify actions to be taken; request configuration, state, and statistical information; receive packets punted by the switch; and send packets out to the switch to be transmitted.

However, using existing techniques for software defined networking and OpenFlow, when a client flow enters the network and there are multiple targets using the same network address, traditional routing techniques will send the traffic to the closest target. If the client flow changes the entry point due to network reconvergence or a user's network path changing, the flow will be sent to a different target that will then reject the session. As a result, a different address is needed for each target, and GSLB must be used to distribute traffic among the targets. Such methods are non-deterministic and rely on expensive device level redundancy to ensure availability. Furthermore, shifting traffic between targets may cause delays perceived by client devices.

Accordingly, a need exists for systems and methods for improved data transmission between network connected devices. More specifically, a need exists for systems and methods for controlled distribution of network flows by performing variations of software defined networking ("SDN") based on elements in the client packet, between devices over the Internet.

SUMMARY OF THE DISCLOSURE

According to certain embodiments, methods are disclosed for distributing network traffic received from a plurality of client devices and bound toward a plurality of servers sharing a common network address, such as an IP address. One method includes receiving network traffic from the plurality of client devices, the network traffic being addressed to a predetermined network address associated with a plurality of servers; separating the received network traffic into assigned buckets based on a respective source network address associated with each unit of traffic; and forwarding the received traffic to one of a plurality of servers associated with the predetermined network address, based on the bucket assigned.

According to certain embodiments, systems are disclosed for distributing network traffic received from a plurality of client devices and bound toward a plurality of servers sharing a common network address. One system includes a data storage device storing instructions for distributing network traffic received from a plurality of client devices and bound toward a plurality of servers sharing a common network address; and a processor configured to execute the instructions to perform a method including: receiving network traffic from the plurality of client devices, the network traffic being addressed to a predetermined network address associated with a plurality of servers; separating the received network traffic into assigned buckets based on a respective source network address associated with each unit of traffic; and forwarding the received traffic to one of a plurality of servers associated with the predetermined network address, based on the bucket assigned.

According to certain embodiments, a non-transitory computer readable medium is disclosed that stores instructions that, when executed by a computer, cause the computer to perform a method of distributing network traffic received from a plurality of client devices and bound toward a plurality of servers sharing a common network address, the method including: receiving network traffic from the plurality of client devices, the network traffic being addressed to a predetermined network address associated with a plurality of servers; separating the received network traffic into assigned buckets based on a respective source network address associated with each unit of traffic; and forwarding the received traffic to one of a plurality of servers associated with the predetermined network address, based on the bucket assigned.

According to certain embodiments, the processor is further configured for, and embodiments of the disclosed systems and methods include, one or more of the following: the network traffic may be separated into assigned buckets by determining which subset of bits of an network address of a client device to evaluate for bucket separations; creating a netmask based on the determined subset of bits, and mapping each source network address to one of the buckets using the netmask; creating an assigned bucket for each of a plurality of possible combinations of the subset of bits, and assigning each bucket to one of the plurality of servers associated with the predetermined network address; assigning each bucket to one of the plurality of servers associated with the predetermined network address; each source network address is mapped to one of the buckets by performing a bitwise AND function on the source network address and the netmask; and each bucket is defined by either a selection of bits of a network address, such as an IPv4 or IPv6 address generated from the bitwise AND of the source network address and the netmask; maintaining a switching layer for separating the received network traffic into assigned buckets; maintaining the plurality of servers for receiving the separated network traffic based on the bucket assigned; each bucket is assigned to one of the plurality of servers associated with the predetermined network address, by performing a round robin assignment of buckets to servers; each bucket is assigned to one of the plurality of servers associated with the predetermined network address, by assigning each bucket to an integer in a hash space and assigning each server to an integer in the hash space; each bucket is assigned to an integer by performing a hash of a netmask or unique bucket ID of the bucket; and each server is assigned to an integer in by performing a hash of a unique ID of the server.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

Figure 1:
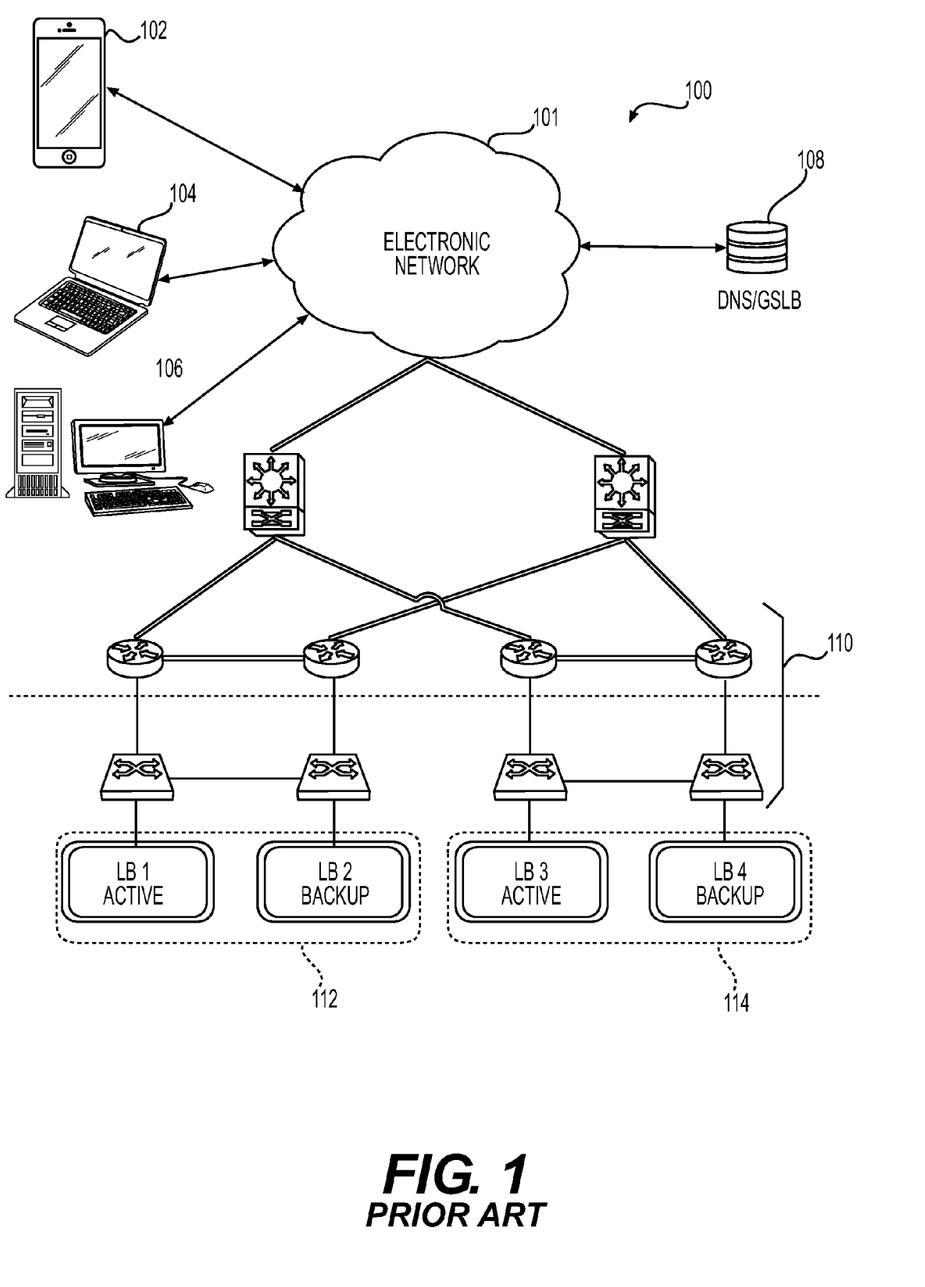
FIG. 1 is a schematic diagram of a prior art system and environment in which devices may transmit data between each other over an electronic network, using traditional high availability techniques.

FIG. 1 is a schematic diagram of a prior art system and environment in which devices may transmit data between each other over an electronic network, using traditional techniques for maintaining high availability using expensive device redundancy. In one embodiment, the prior art method begins when the client (such as one of client devices 102, 104, 106) requests an address for a web service (such as a blog, content server, chat server, mobile app server, etc.) operated by one or more of load balancer 1 (LB1) and load balancer 3 (LB3). Consistent with typical domain name tracking and routing, a nearby DNS server, e.g., DNS server 108 (which may also be a global server load balancer (GSLB)) may return the network address for the web service executed at LB1. The client device 102, 104, 106 may then send a synchronize packet (SYN) to the web service executed at LB1 on a first virtual IP ("VIP") 112, which may return back a synchronize acknowledgement (SYN/ACK). The client device 102, 104, 106 may then send an acknowledgement (ACK) back to the web service executed at LB 1, and data flow may begin.

If the client connection to the web service fails, then either the VIP 112 may send a reset to the client device, or the client device TCP timeout may expire. The client may retry the connection, but eventually the client may likely need to re-establish communications. Thus, the client may again request the address for the web service, and the DNS server 108 may this time return the address for the web service, but (due to varying location, availability, or random chance) on a different VIP of the network server (e.g. to second VIP 114). The client may then send a SYN packet to the web server executed on the second VIP 114, which returns a SYN/ACK. The client may send an ACK back to the second VIP 114 and data flow may resume. This method requires a different address for each target and uses GSLB to distribute traffic among the targets. Furthermore, the method is non-deterministic and relies on expensive device level redundancy to ensure availability. Also, it may be difficult or impossible to shift traffic between targets without causing significant disadvantages for clients.

Accordingly, the present disclosure describes systems and methods for data transmission between network connected devices, and for controlled distribution of network flows across servers by performing variations of software defined networking ("SDN") based on elements in the client packet. Specifically, the present disclosure is directed to systems and methods that involve separating network traffic into multiple buckets based on various bits of the frame of a client packet. According to aspects of the present disclosure, the selection of bits for bucket analysis and separation may be made by analyzing frames to determine what source network address bits are the most random (e.g., as being equally likely to be a 0 or 1 and not strongly correlated to any other bit). It should be appreciated that the presently disclosed and claimed "network addresses" may in some cases be "IP addresses." These buckets may then be assigned across the pool of destinations using a consistent hashing algorithm. The consistent hash may promote the interest that all nodes will, given the same configuration, arrive at the same mapping of source to destination without any coordination between nodes and with minimal disruption should a status change occur, such as a destination becoming unreachable. Any suitable hash algorithm may be used as long as it is the same across all control points. The consistent hash may optionally use traffic statistics to weight the allocation of buckets to destinations to provide a more even distribution of traffic.

Once the mapping is complete switching devices may be programmed with the results, using SDN. This programming may define how inbound traffic for a particular destination is matched to a bucket based on the bits, and forwarded to the appropriate destination based on that bucket. By using static flows, no further controller interaction is required to maintain the flow state table unless there is a change in state of one of the destinations or there is some other event that requires reconfiguration. In one embodiment, this enables controlled and predictable distribution of network flows across numerous destinations regardless of where they enter the network without requiring continuous synchronization between elements, high availability through redundancy or stateful awareness.

In one embodiment, the presently disclosed systems and methods may enable one or more of the following objectives and/or advantages: (1) the creation of "buckets" based on a subset of the frame components that may be destined for a virtual network destination; (2) the allocation of buckets to local real destinations that service the virtual destination via a consistent and repeatable method that results in a functionally random and statistically balanced distribution; (3) the configuration of forwarding rules in a network switch's forwarding table to implement the bucket allocation, such that all traffic from a particular source is uniformly forwarded toward a particular destination by the entire network, regardless of ingress point or network path; (4) the mitigation of the need for controllers to maintain state of the data flows; (5) the mitigation of the need for tunnels, such as GRE or IP in IP to functions; and (6) the mitigation of the need for all targets be in the same layer two (2) broadcast domain.

Figure 2:
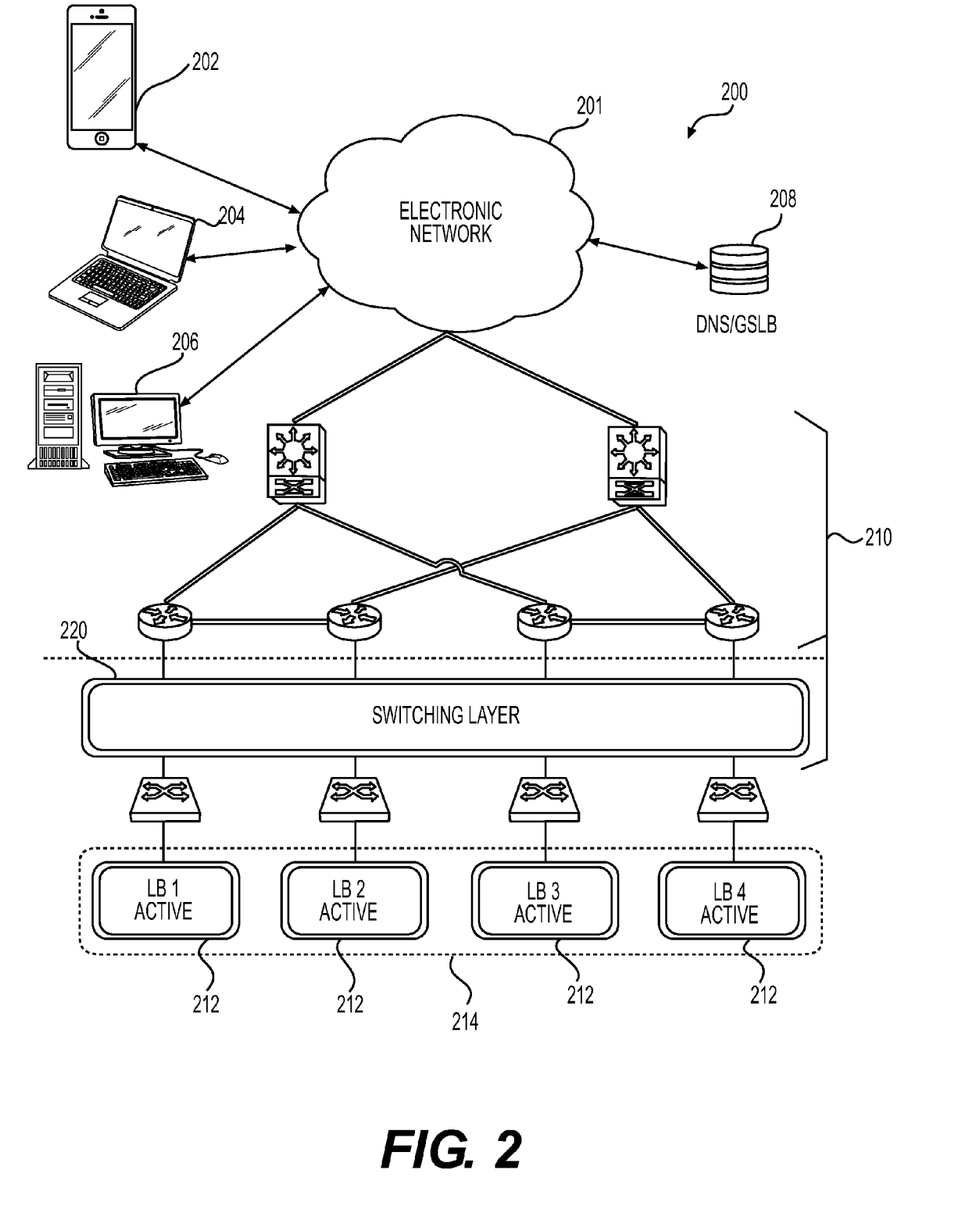
FIG. 2 is a schematic diagram of an exemplary system and environment in which devices may transmit data between each other over an electronic network using a switching layer, according to an exemplary embodiment of the present disclosure.

Turning back to the appended figures, FIG. 2 is a schematic diagram of an exemplary system and environment 200 in which devices may transmit data between each other over an electronic network, and distribute network traffic across servers, according to an exemplary embodiment of the present disclosure. As depicted in FIG. 2, environment 200 may include any number of client devices interacting with one or more network servers over an electronic network 201, such as the Internet. As shown in FIG. 2, the client devices may include, for example, a mobile device or tablet 202, a laptop 204, and/or a computer or server 206.

In one embodiment, client devices 202, 204, 206 may be owned and/or used by one or more people, who may be viewers of web pages and/or consumers of content over the Internet, either through an application, mobile browser, or web browser stored on respective user devices. Client devices 202, 204, 206 may include any type of electronic device configured to send and receive data, such as websites, multimedia content, and electronic advertisements, over electronic network 201. For example, each of client devices 202, 204, 206 may include a mobile device, smartphone, and/or personal digital assistant ("PDA") disposed in communication with electronic network 201. In addition, each of client devices 202, 204, 206 may be a tablet computer or any other kind of touchscreen-enabled device, personal computer, laptop, and/or server disposed in communication with electronic network 201. Each of client devices 202, 204, 206 may have a web browser and/or mobile browser installed for receiving and displaying electronic content received from one or more web servers. Each of client devices 202, 204, 206 may have an operating system configured to execute a web or mobile browser, and any type of application, such as a mobile application. In one embodiment, client devices 202, 204, 206 may be configured to download applications and/or application content from application servers. In one embodiment, client devices 202, 204, 206 may be configured to download one or more mobile applications from a mobile application server, and execute those one or more applications to receive and manipulate electronic content received from one or more of web servers and/or content distribution servers.

The one or more server systems 210 may include any type of web server, service, or any other type of web resource that may be accessed by one or more of the client devices 202, 204, 206. In one embodiment, the server systems 210 may include, for purposes of illustration, one or more Simple Object Access Protocol ("SOAP") servers, one or more Extensible Markup Language ("XML") servers, and/or one or more ("Representational State Transfer") REST servers. In one embodiment, one or more of server systems 210 may be associated with an entity that operates any type or number of Web-based services.

Any or all of the depicted devices and/or servers may be disposed in communication with an electronic network 201, such as the Internet. Moreover, any pair of the devices and/or servers may be configured to exchange data packets over the electronic network 201 according to any suitable predetermined protocol, such as hypertext transfer protocol ("HTTP") and transmission control protocol/internet protocol ("TCP/IP"). Any or all of the devices and/or servers may be configured to perform various techniques for exchanging requests for data, responses to requests for data, and data, in manners so as to distribute network traffic among a plurality of load balancing servers.

Specifically, FIG. 2 depicts a proposed embodiment in which a client device (such as one of clients 202, 204, 206) may request the address for a web service (e.g., a blog, content site, streaming content, etc.) operating on load balancing servers 212 of a VIP 214, where each load balancing server 212 advertises the same network address associated with VIP 214. In contrast with the traditional arrangement described above with respect to FIG. 1, the system 200 of FIG. 2 may include a switching layer 220, which may be operating on any suitable type of server or router, and implementing any desired type of traffic director or software defined networking (SDN) director consistent with the methods described below.

Accordingly, upon receiving a request from a client device 202, 204, 206 for a web service of VIP 214, a DNS server 208 may return the single common network address for the web service operating on VIP 214. The client device may send a synchronizing packet (SYN) to the web service, which may be running on a plurality of servers (in this case four devices: LB1, LB2, LB3, and LB4). An SDN traffic director associated with the exemplary switching layer 220 may select LB1 for this flow, and the web service on LB1 may return a synchronization acknowledgement (SYN/ACK). The client device may return an acknowledgement (ACK), and data flow may begin. If a client connection to the web service on LB1 fails, then the SDN traffic director operating on the exemplary switching layer 220 may instruct a different load balancer of VIP 214 to return a reset to the client device, thereby mitigating the need for a timeout. Since the same address may be used for multiple load balancers (e.g., LB1, LB2, etc.), the client device may send a new SYN, and the SDN traffic director operating on the exemplary switching layer 220 may select a new load balancing server (e.g., LB3) and re-establish communications.

The above-described architecture of FIG. 2 may solve the problems described above with respect to FIG. 1 of multiple targets using the same network address when a client flow enters the network. That is, normal routing will send the traffic to the closest target, such that if the client flow changes the entry point due to network reconvergence or a client's network path changing, the flow will be sent to a different target that will then reject the session. Using an SDN traffic director in switching layer 220, it may be possible to avoid using data center GSLB and expensive device level redundancy, and furthermore to enable high availability and moving of customer flows between targets with minimal impact.

More specifically, by implementing the methods described below with respect to FIGS. 3, 4A-4C, and 5A-5C, system 200 may be configured to accept traffic bound for a single address, distribute that traffic to multiple servers (e.g., able to distribute to at least 32 servers, but alternatively to many more), roughly balance traffic between servers (e.g., limiting variance in load between servers to below around 10%), and rewrite layer 2 and/or 3 addresses as desired (e.g., to handle single network addressing or NAT addressing from virtual to actual server IPs). In addition, by implementing the methods described below with respect to FIGS. 3, 4A-4C, and 5A-5C, system 200 may be configured to: allow a server to be drained of traffic without disrupting live sessions; re-balance traffic based on usage data if load share is too unfair; allow for multiple parallel configurations of virtual IPs and pools; perform live reconfiguration of server pools and virtual IPs (both manual adds/changes/deletes via an API, and automatic add/removes based on health checks or port state changes); experience minimal or no impact from controller failure; and enable future implementation of IPv6.

Figure 3:
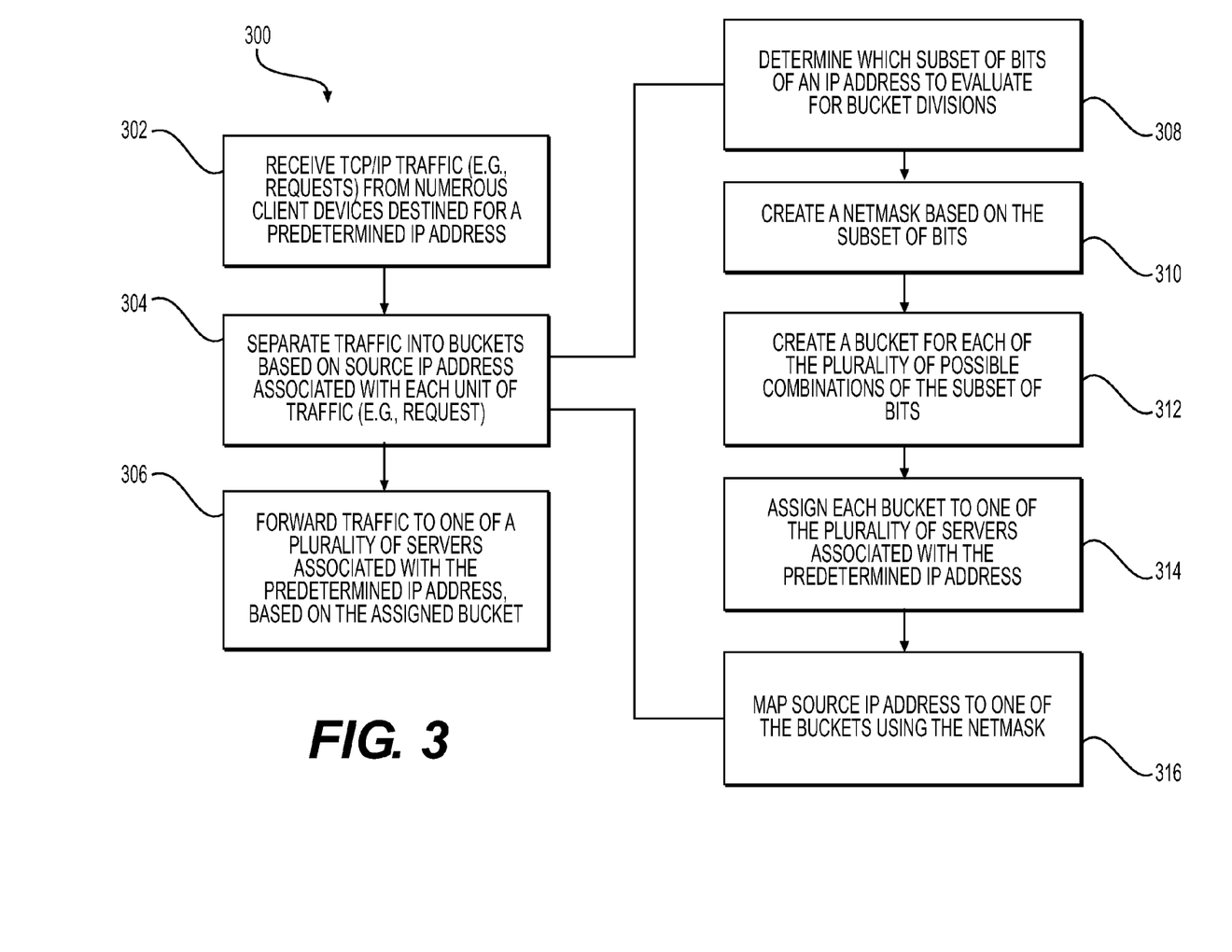
FIG. 3 is a flow diagram of an exemplary method by which devices may transmit data requests and data between each other over an electronic network, and have network flows distributed across servers, according to an exemplary embodiment of the present disclosure.

FIG. 3 is a flow diagram of an exemplary method by which devices may transmit data requests and data between each other over an electronic network, and distribute network traffic across servers, according to an exemplary embodiment of the present disclosure. Accordingly, as described above, the presently disclosed systems (e.g., servers 210, 212, 220) are directed to solving the above-disclosed disadvantages, such as by executing the exemplary methods of FIGS. 3, 4A-4C, and 5A-5C. FIG. 3 depicts an exemplary method 300 for exchanging data, such as requests and responses for data, between a client device (e.g., a device 202, 204, 206) and network device (e.g., a server or other device executing switching layer 220 or a load balancing server 212).

In one embodiment, method 300 may include the network device (e.g., a server or other device executing switching layer 220 or a load balancing server 212) receiving TCP/IP traffic (e.g., requests) from numerous client devices (e.g., a plurality of client devices 202, 204, 206) destined for a predetermined network address (e.g., IP address) (step 302). As described above with respect to FIG. 2, the traffic may be received in relation to one or more web services, such as a blog, a content site, a streaming content site, a multimedia site, a web application, a mobile application, or any other web service that implements HTML and/or TCP/IP. As described above, especially in cases of heavy network traffic, such as involving interaction with hundreds of thousands or millions of client devices, it may be desirable to distribute network traffic between several network servers, such as between load balancing servers 212 of VIP 214, depicted in FIG. 2.

Accordingly, method 300 may further include separating the received traffic into buckets based on a respective source network address associated with each unit of traffic (e.g., request) (step 304). For example, in one embodiment, traffic may be separated into buckets according to the following exemplary embodiment. Specifically, the network device (e.g., a server or other device executing switching layer 220 or a load balancing server 212) may determine which subset of bits of an network address of a client to evaluate for bucket divisions (step 308), create a netmask based on the subset of bits (step 310), create a bucket for each of the plurality of possible combinations of the subset of bits (step 312), assign each bucket to one of the plurality of servers associated with the predetermined network address (step 314), and map each source network address to one of the buckets using the netmask (step 316).

In one embodiment, the network device (e.g., a server or other device executing switching layer 220 or a load balancing server 212) may determine which subset of bits of an network address of a client to evaluate for bucket divisions (step 308) by determining the bits that are the most random and/or that have the lowest correlation with other chosen bits. In other words, the subset of bits of an network address (e.g., IP address, whether 32-bit IPv4 or 128-bit IPv6) may be selected based on the fact that they are nearly equally likely to be a 1 or a 0, and that they are not regularly the same or the opposite of another selected bit. In one embodiment, a program may be used to parse source network addresses, and for each bit, calculate the ratio between zero and one bits and the correlation of that bit to each of the other bits in the address (and the standard deviation between those measurements). The bits may be sorted from most to least random (defined as closest to a 1:1 ratio between zeroes and ones). Then, starting at the n-th most random bit, each bit's correlation may be checked against the more random bits, and if the correlation between the bit's state and the other bit's state is outside of 1 standard deviation from 50/50, that bit may be disqualified, the next most random bit may be included in the set, and the correlation check restarted.

Figure 4A:
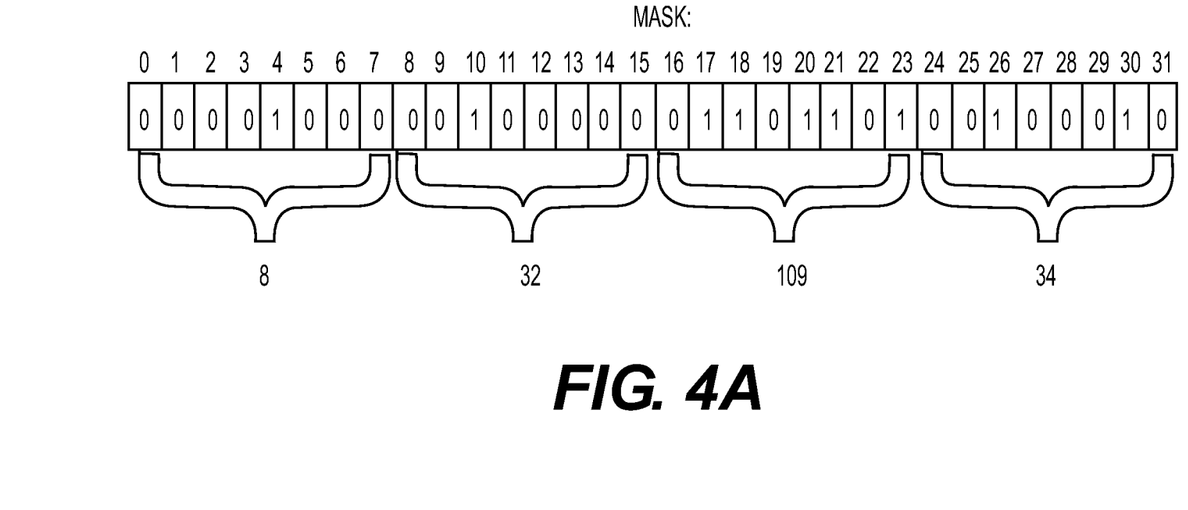
FIG. 4A is a schematic diagram of an exemplary netmask that may be generated to evaluate client device source network addresses for performing network flow distribution, according to an exemplary embodiment of the present disclosure.

In one embodiment, it may be determined that nine of the 32 bits in an network address are ideal for evaluating for bucket assignment. Specifically, as shown in FIG. 4A, in one embodiment, it may be determined that bits 4, 10, 17, 18, 20, 21, 23, 26, and 30 are the most desirable in terms of randomness and lowest correlation with other chosen bits. Of course, it should be appreciated that literally any combination of bits may be selected for use in the present disclosure, and that the presently disclosed subset of source IP bits represent only one of many different combinations of bits applicable to and contemplated within the scope of the presently disclosed systems and methods. Moreover, it should be appreciated that the disclosed methods should be adjusted accordingly based on the number of selected bits, and the identities of the selected bits, since the embodiments described below are only exemplary in nature.

In one embodiment, the network device (e.g., a server or other device executing switching layer 220 or a load balancing server 212) may create a netmask based on the subset of bits (step 310) by setting the selected bits as 1s and the non-selected bits as 0s. For example, as shown in FIG. 4A, bits 4, 10, 17, 18, 20, 21, 23, 26, and 30 may be set "on," (i.e., as "1"s or ones) so as to create a netmask with the value or address: "8.32.109.34," for example.

FIG. 4A is a schematic diagram of an exemplary netmask that may be generated to evaluate client device source network addresses, according to an exemplary embodiment of the present disclosure. Specifically, the netmask may be generated based on the bits of a source network address that are selected for mapping addresses to buckets. In one embodiment, the selection of which bits to use for mapping addresses to buckets may be considered carefully to identify bits that result in an even and predictable distribution of network traffic. Specifically, bits may be selected based on the understanding that not all bits are as random as others are, as addresses tend to clump around certain ranges. In one embodiment, to determine the best bits, samples of source addresses may be analyzed, where analysis is improved by higher numbers of available samples available, and the higher randomization of those samples. If during certain times, the randomness of certain bits varies widely (for example, bits that are completely random from source addresses connecting at 2 pm EST are always zero at 2 am EST, because certain countries/regions/late night Internet cafes/etc. have different addressing patterns), the problem becomes significantly more complex, but in some cases it may be assumed that bits that are more random over the course of the analysis and random enough over short sample periods to adequately distribute traffic. In one embodiment, as described above, the analysis may take into account two different factors: (1) how often a particular bit is zero or one across all the source addresses, where the ratio should be as close to 1:1 as possible; and (2) how often a particular bit is the same as each other bit in the source address (where the probability should be as close to 50% as possible). In one embodiment, the bits selected may be the ones closest to a one-to-zero ratio of 1.0 (1:1) that do not have an abnormally high correlation factor (within 1 standard deviation from 50%).

Figure 4B:
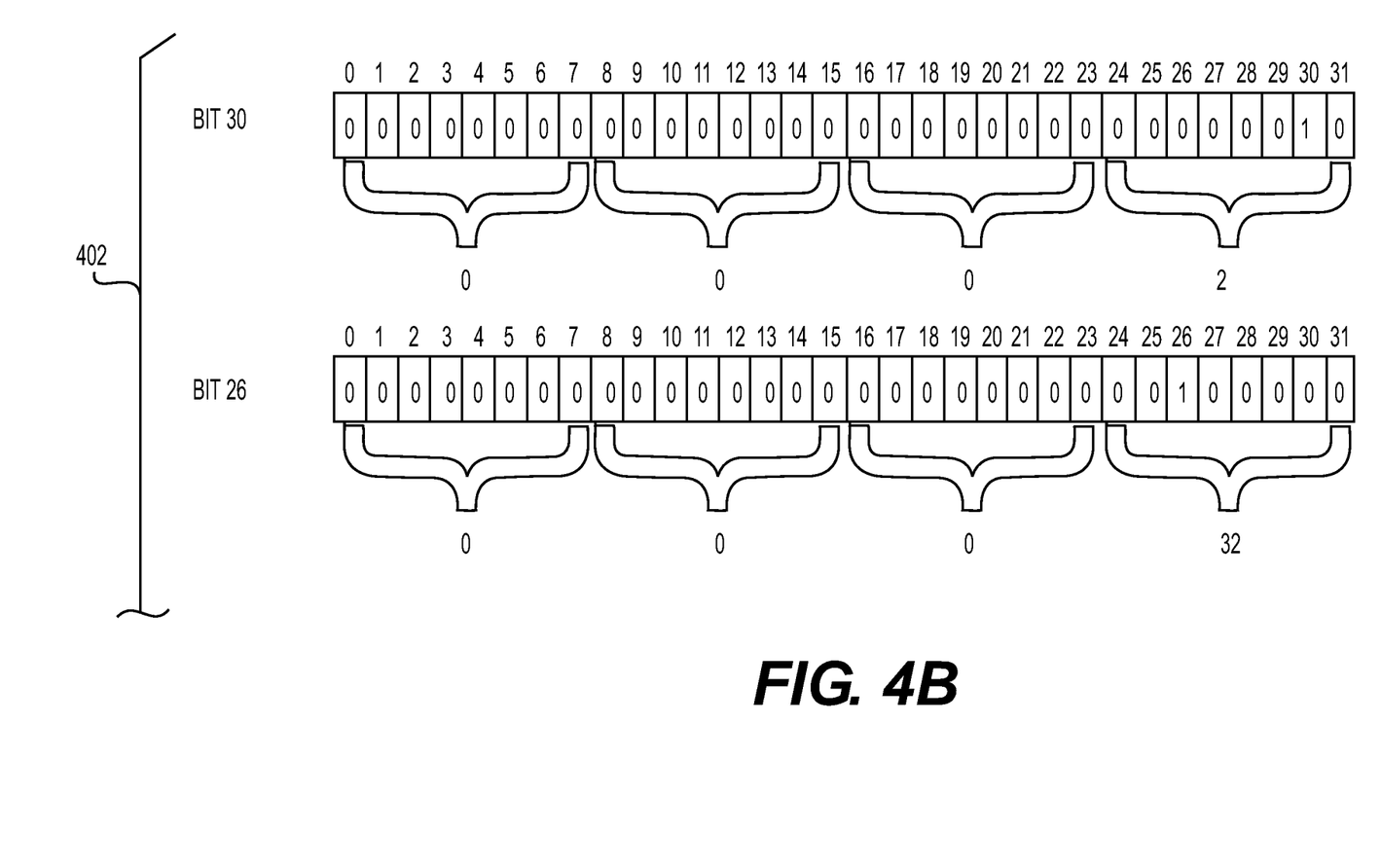
FIG. 4B is a schematic diagram of a plurality of buckets, represented by bit netmasks, which may be used to distribute traffic across network resources, according to an exemplary embodiment of the present disclosure.

In one embodiment, the network device (e.g., a server or other device executing switching layer 220 or a load balancing server 212) may create a bucket for each of the plurality of possible combinations of the subset of bits (step 312) by going through all possible network values for the subset of bits (e.g., the nine selected bits 4, 10, 17, 18, 20, 21, 23, 26, and 30) setting each bit to 1 or 0 in varying combinations. For example, in addition to the nine buckets having only one of the selected nine bits, there may be a bucket for each combination of two selected bits (e.g., 4-10, 4-17, 4-18, and so on), a bucket for each combination of three selected bits (e.g., 4-10-17, 4-10-18, 4-10-20, and so on). For a subset of n bits, there may be $2^n$ different combinations of bits (i.e., "networks" or buckets), so for the above subset of bits, there may be $2^9$ or 512 different networks or buckets. FIG. 4B is a schematic diagram of a plurality of buckets, represented by bit netmasks, which may be used to distribute traffic across network resources, according to an exemplary embodiment of the present disclosure. For example, FIG. 4B shows a netmask/bucket in which only selected bit 30 is set to 1, resulting in a bucket with netmask 0.0.0.2; a netmask/bucket in which only selected bit 26 is set to 1, resulting in a bucket with netmask 0.0.0.32; a netmask/bucket in which only selected bits 26 and 30 are set to 1, resulting in a bucket with netmask 0.0.0.34; a netmask/bucket in which selected bits 10, 17, 18, 20, 21, 23, 26, 30 are set to 1, resulting in a bucket with netmask 0.32.109.34; and a netmask/bucket in which all selected bits are set to 1, resulting in a bucket with netmask 8.32.109.34. In one embodiment, buckets may be manually created. Manually created buckets can be used to redirect specific source traffic to a specific server, to split up an automatically created bucket that carries an unmanageably disproportionate share of traffic, or for a variety of testing and troubleshooting purposes. Manual buckets may be added to the normal bucket pool and moved around as part of the automatic assignment process, or be statically assigned to a server, in which case the bucket is only used when that server is in service.

In one embodiment, the network device (e.g., a server or other device executing switching layer 220 or a load balancing server 212) may assign each bucket (in this case, of the 512 buckets) to one of the plurality of available servers associated with the predetermined network address of VIP 214 (step 314). In one embodiment, if all the bits of an network address that match the 1 bits in the netmask also match the same bit in the bucket/network, then that network address may be assigned to that bucket/network. In one embodiment, buckets may be assigned to servers using a consistent hashing algorithm that promotes: (i) spreading or scattering buckets across servers in a relatively random method; (ii) consistency between runs of the hashing algorithm; and (iii) changing only buckets moved on/off of an added or removed server. The assignment of buckets to servers will be described in more detail below with reference to FIGS. 5A-5C.

Figure 4C:
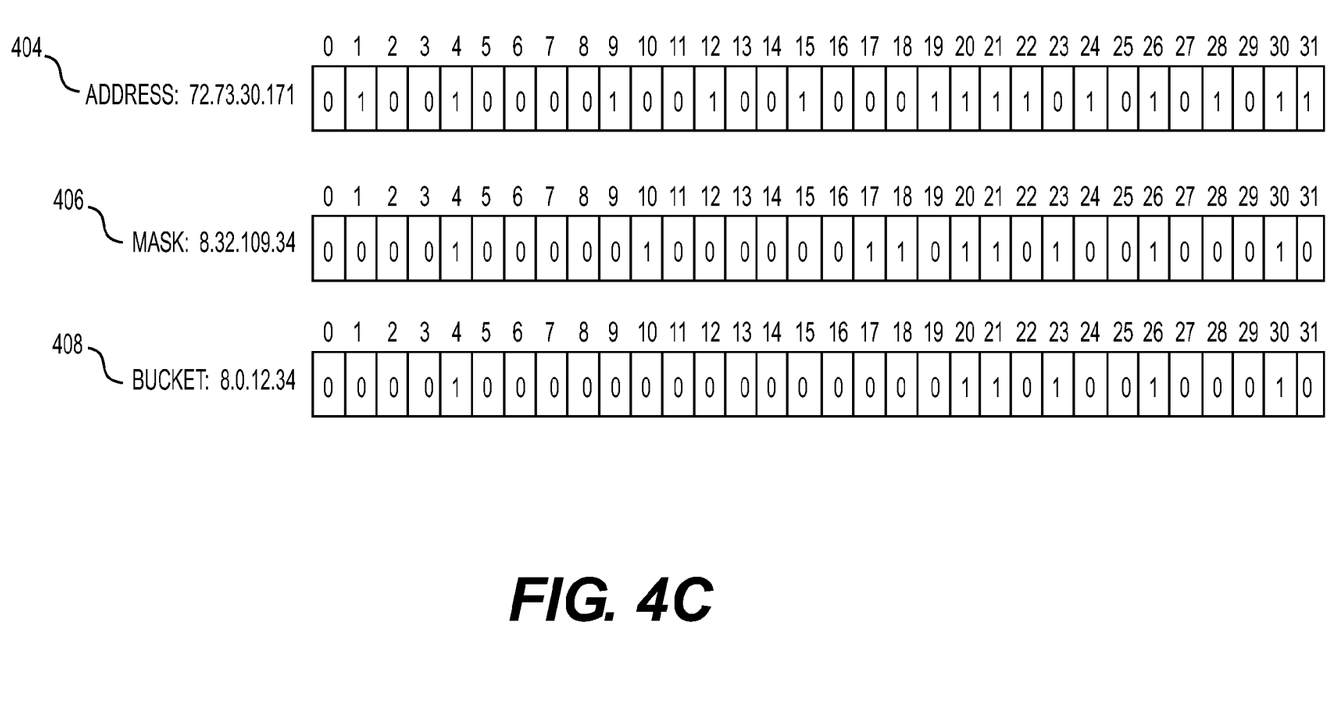
FIG. 4C is a schematic diagram representing how an exemplary source network address may be mapped by a netmask into a bucket, according to an exemplary embodiment of the present disclosure.

In one embodiment, the network device (e.g., a server or other device executing switching layer 220 or a load balancing server 212) may map each source network address to one of the buckets (step 316) by applying the exemplary netmask described with respect to FIG. 4A to each source network address. FIG. 4C is a schematic diagram representing how an exemplary source network address may be mapped by a netmask into a bucket, according to an exemplary embodiment of the present disclosure. For example, as shown in FIG. 4C, when a new client flow or network flow is received, the switching layer 220 may extract the source network address 404 from the client packet, which in this case is chosen for example to be: 72.73.30.171.

In one embodiment, the buckets may be assigned by performing a bitwise AND function on the IP source address 404 and the netmask 406 generated in step 310 from the selected subset of source network address bits. Thus, in the exemplary embodiment of FIG. 4C, when the address 404 is combined with the netmask 406 using the bitwise AND function, a bucket 408 may be generated, which in this case is bucket "8.0.12.34". By generating the netmask from relatively random bits of the source network address, network traffic may be expected to spread relatively evenly across the generated buckets. Method 300 may then include forwarding the received traffic to one of a plurality of servers (e.g., one of load balancing servers 212) associated with the predetermined network address, based on the bucket assigned in step 304 (step 306).

Figure 5A:
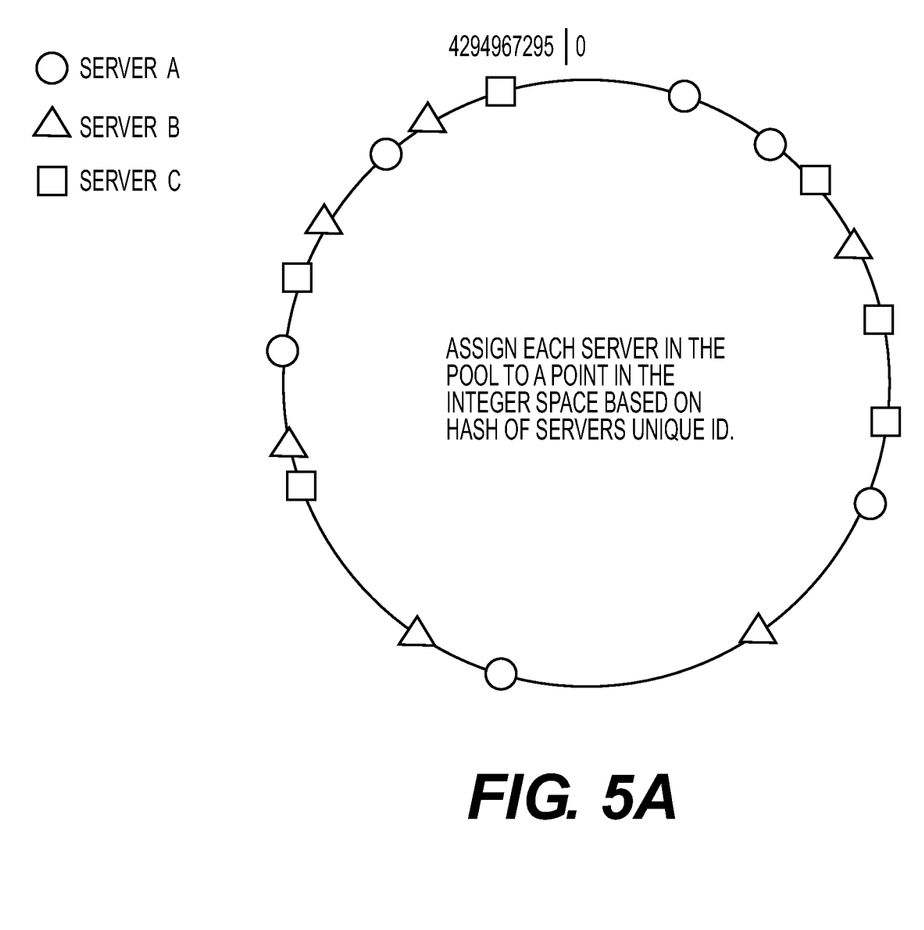
FIGS. 5A-5C are schematic diagrams of an exemplary hashing method used to assign buckets of network traffic across available network servers, according to an exemplary embodiment of the present disclosure.
Figure 5B:
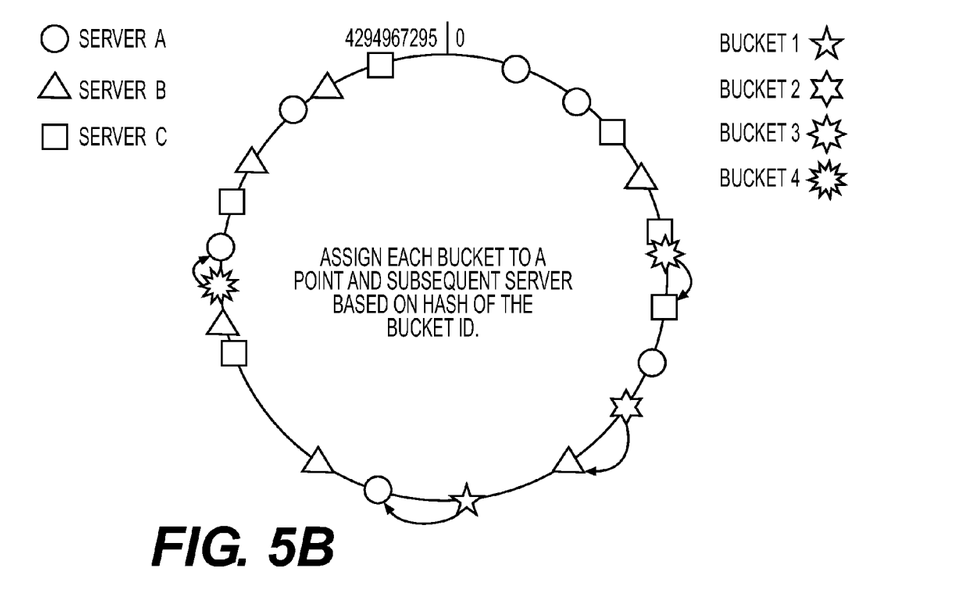
Figure 5C:
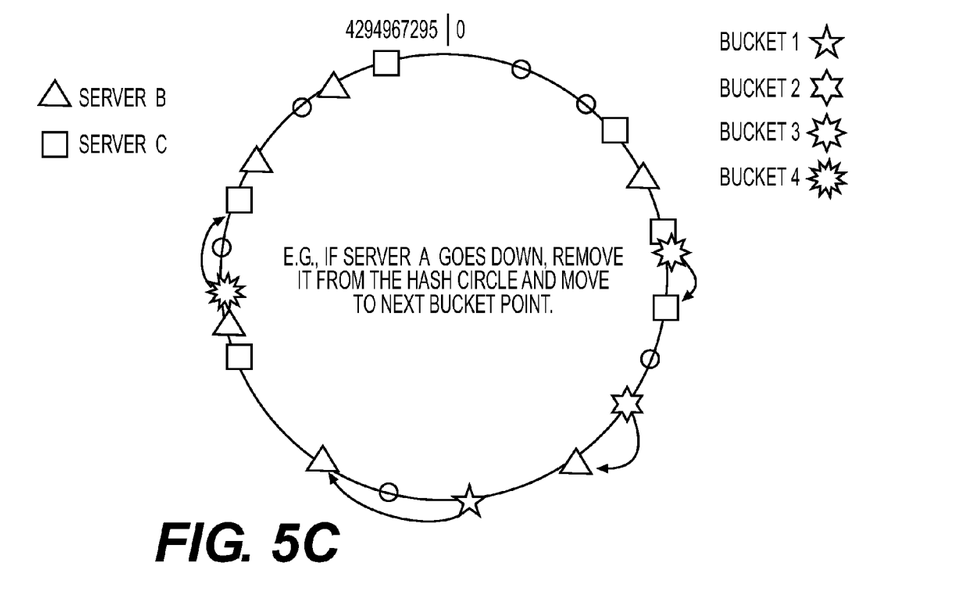

FIGS. 5A-5C are schematic diagrams of an exemplary hashing method used to assign buckets of network traffic across available network servers, according to an exemplary embodiment of the present disclosure. In one embodiment, a hashing space may be created that is consistent with the space depicted in FIG. 5A. For example, a hash space may be generated based on a circle with each point corresponding to a 32-bit integer, from 0 to 4,294,967,295. In one embodiment, for each server, the method may generate numerous pseudo-random points on the circle using a hash (e.g., an MD5 hash) of the server's unique ID. In one embodiment, for each bucket, the method may generate a pseudo-random point from a hash (e.g., an MD5 hash) of the bucket's unique ID or generated netmask.

Thus, as shown in FIG. 5A, each server (e.g., servers A, B, and C) may be assigned to multiple integers within the defined integer space. Moreover, as shown in FIG. 5B, each bucket (e.g., buckets 1, 2, 3, and 4) may be assigned to a point, and therefore to the subsequent server (i.e., sequentially next in integer order) based on the hash of the bucket ID. In other words, the method may involve (i) assigning a bucket to an integer of the circle, (ii) going around the circle clockwise until reaching the next integer to which a server is assigned, and (iii) assigning the bucket to the encountered server. Of course, this may be performed for each of the buckets, regardless of how many buckets are generated and how many servers are involved. As shown in FIG. 5C, if a server (e.g., server A) goes down, it may be removed from the hash space (i.e., the integer circle) and the buckets therein may be moved to the sequentially next server. It should be appreciated that by assigning each server to multiple integers on the hash space or integer circle, buckets may evenly spread across servers even when a particular server goes down.

In one embodiment, initially, the buckets may be assigned to servers in a round-robin fashion. That is, if there are s servers, bucket 1 may go to server 1, bucket 2 may go to server 2 . . . bucket s goes to server s, bucket s+1 goes to server 1, etc. For each bucket, a flow matching the source network address bits (with the rest of the address wildcarded) may be sent to the load balancing switch, with an output action of changing the destination MAC (and network address, if applicable) to the server the bucket is assigned to, and to send it out the appropriate port. These rules may be sent with low priority, so that more specific rules can override them.

To implement an automatic load re-balancing solution, wherein traffic flows are more carefully balanced in the long run, the controller may keep track of the usage statistics for each bucket's flow, and assign a weight to each bucket in proportion to the ratio between its flow's usage and the average, such that a bucket that takes twice the traffic as the average has a weight of 2, a bucket that takes half the average traffic has a weight of 0.5, etc. When traffic is re-balanced, it is the sum of the weights, not the number of flows, that may be equalized across servers. These statistics may have a long enough lifetime that traffic does not change erratically, yet short enough that bursts of traffic do not unduly influence bucket distribution long after they have ended. In this embodiment, the bucket to server assignment may be modified such that: buckets are assigned in order of their traffic, with the busiest buckets going first; the amount of traffic assigned to each server may be tracked; if a bucket would cause a server's total traffic to go over its maximum, the server may be skipped, and the search continues around the circle; if no servers have enough space left and the search goes all the way around the circle, the server with the lowest assigned traffic may be picked.

In addition to buckets, servers may have weighting settings as well. These can be used to ensure a less powerful server gets a smaller share of the traffic than a more powerful server does. This can be expressed as a real value; for example, a server with a share of 0:5 would receive half the traffic of a "normal server." The opposite should also be possible, i.e., to use a share of 2:0 to send double traffic to a server. It should also be possible to set a server to a state where it is not in the usual bucket rotation, such that buckets must be manually assigned to it. This state is referred to as manual-only. This allows for the creation of troubleshooting and special purpose servers that do not have to handle normal traffic.

Server changes can be initiated by the user or by the controller by detecting changes in server state. The simplest form of the latter is in response to a port changing state, but the controller can also be in contact with the servers in a variety of ways, from ping testing to talking to a live daemon on the server to actually testing the server's service. There are also three different ways a server can be added to or removed (dropped) from the pool. These methods will be referred to as delayed, graceful, and immediate. The exact meaning for each, both for adds and removes, are explained below.

Immediate adds and drops may be used for critical situations. Changes may happen as rapidly as possible, and there may be a high probability that sessions in flight will be lost. In an immediate drop, all flows destined for the dropped server may be immediately reassigned to the remaining servers. Any existing sessions to the current server may be severed in the process. This action may be most appropriate when a server has failed; in this case, its sessions are already lost, and recovering connectivity for its assigned source ranges is the only concern. If a server's port goes down, an immediate drop is the appropriate response. An immediate add calls for existing flows to be redirected to the new server. The controller performs a re-balance and implements it immediately, which may break any existing sessions on flows that have moved.

In one embodiment, graceful adds and drops may be expected to be a default setting. In a graceful add or drop, the system may strive to limit or completely prevent sessions from being lost. To do this, the controller may determine a re-balanced configuration with the new server having been dropped or added. The controller may then compare that to the existing configuration, bucket by bucket. If a particular bucket needs to move, the controller may performs the following steps: (1) add a rule forwarding all non-TCP traffic to the new destination, at a higher priority than the previous rule; (2) change the flow rule from forwarding out the appropriate port to sending the packet to the controller; (3) when a packet is received, its headers may be checked for the SYN bit (If it is set, a flow may be added to the switch matching the packet's source and destination address and port, destined for the new server, at a higher priority than the original rule. The packet may be transmitted to the new server. If it is not set, and the FIN bit is not set, a similar flow may be added, only destined for the old server and with an idle timeout (default to 15 seconds) and a hard timeout (default of 600 seconds). The packet may be forwarded to the old server. If the FIN bit is set, the packet may be transmitted to the old server, but no flow is added) (4) repeat step 3 until the flow search timeout (defaults to 15 seconds) passes without a new flow to the old server, or until the flow table is 90% full; (5) change the original rule to simply point all traffic to the new server; and (6) remove the non-TCP rule.

In one exemplary embodiment, and for purposes of illustration, it should be appreciated that, in the sample case of 512 buckets, because only a fraction (e.g., 1/512 or 0.1%) of traffic is moved at a time, it is expected that the flow table can handle the number of connections being closely monitored. There may be a spike in jitter for the first packet inspected, but it can be expected to be much less intrusive than dropping the traffic. A connection that is idle longer than the timeout period might be lost. On the other hand, connections that are constantly busy and persistent might never timeout via the idle timer, so a 10 minute (600 second) hard timeout may be added. A graceful drop effectively drains the server in question; a graceful add brings it online slowly and with minimal disruption. This algorithm, using the default timeouts but otherwise best case, will move a bucket every 15 seconds. The fewer servers in the existing pool, the more servers per bucket, and therefore the longer this will take. Adding or removing the 32nd server to a pool of 31 means moving 16 buckets; at 15 seconds a bucket, it will take 4 minutes to complete. For the 16th server, this will take 8 minutes. Adding or removing the second server will take over an hour (64 minutes). For this reason, although it has a higher potential for being disruptive, more aggressive timers should be considered if loading or unloading a server needs to happen faster, which means these values have to be selectable by the user when the change is requested. Also, it may be possible, given a large enough flow table, to move more than one bucket at a time.

With a delayed add or drop, the server may be logically added or removed from the list of active servers, but immediate changes to the flow tables may be avoided or delayed; instead, changes may happen the next time the controller performs a re-balance for some other reason. The exact behavior may depend on the load balancer's other behaviors. For example, if it does not periodically re-balance itself, a delayed add server functionally acts as a hot spare, but otherwise it will eventually be brought online by the normal flow of events. The most likely use of a delayed add or drop would be when multiple changes are going to be made, and the requester does not want the system to begin work until it is aware of all the changes that are going to be made, so as to limit system churn. The procedure would be to put in all the changes except the last one as delayed, or put them all in as delayed and then ask the system to re-balance. It should be clear that requesting a delayed drop or add does not guarantee changes will not happen until specifically requested; any other change can trigger them, and they will be performed gracefully or immediately based on the trigger.

In one embodiment, a new add/drop may be requested while one is currently being handled. This should only be an issue if the running one is a graceful add or drop. Delayed add/drops, by nature, may be avoided until another one triggers a change. An immediate add/drop takes little time to resolve, and while it may be possible that it could be interrupted with another that counteracts it, or that, if done in parallel, would lower the overall impact compared to resolving each in turn. However, the most intuitive approach, and the easiest to implement, would be to resolve the immediate case immediately, without any re-thinking, in the order received. In the case of a graceful add/drop being interrupted by another graceful add/drop, the controller should finish the move it is currently working on, rebalance the traffic with the new drop/add, and restart the graceful process. If a graceful add/drop is interrupted by an immediate update, the graceful process may be interrupted and the new changes may be implemented immediately. Finally, if a delayed add or drop arrives during a graceful update, the delayed changes may wait for the next update instead of being integrated into the running changes.

In one embodiment, a re-balancing procedure may be initiated when a server is added or dropped. It might also be triggered periodically if buckets are weighted by usage, or by user request (for example, to trigger a delayed add or drop). How a re-balance is actually implemented may depend on how the trigger was requested. The graceful method may be the default method in cases where a drop or add was not requested specifically using a different method. A simple re-balance may assume all flows are equal. Since the initial balancing setup may assign flows in a round-robin pattern, after a server is dropped, there may be a number of buckets that are unassigned, which may be assigned to new servers, continuing the original pattern without the missing server (or servers). An add reverses the process, removing flows from servers in a round-robin fashion, starting with the servers that have more flows (if applicable.) If flows are weighted by traffic, each bucket may have a weight assigned to it representing the ratio between that bucket's traffic and the average of all the buckets' traffic. The weights may be equalized using any number of algorithms, with different levels of disruption and better distribution of traffic.

Any of client devices 202, 204, 206, and/or servers 212, 220 may include any type or combination of computing systems, such as handheld devices, personal computers, servers, clustered computing machines, and/or cloud computing systems. In one embodiment, client devices 202, 204, 206, and/or servers 212, 220 may be an assembly of hardware, including a memory, a central processing unit ("CPU"), and/or optionally a user interface. The memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. The user interface may include any type or combination of input/output devices, such as a display monitor, touchpad, touchscreen, microphone, camera, keyboard, and/or mouse.

Figure 6:
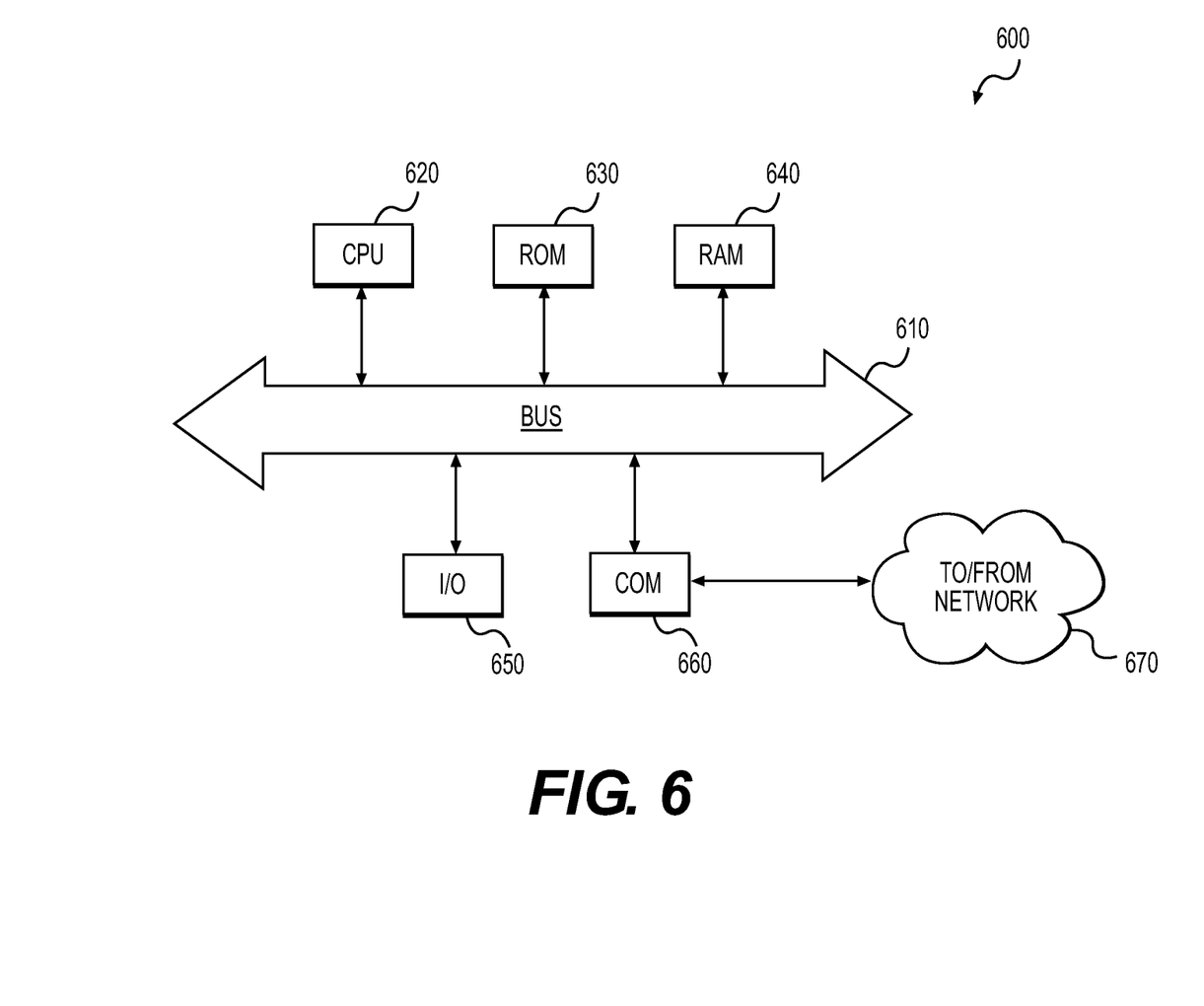
FIG. 6 is a simplified functional block diagram of a computer that may be configured as a device or server for executing the methods of FIGS. 2-5C, according to exemplary embodiments of the present disclosure.

FIG. 6 is a simplified functional block diagram of a computer that may be configured as a device or server for executing the methods of FIGS. 2-5C, according to exemplary embodiments of the present disclosure. Specifically, in one embodiment, as shown in FIG. 6, any of devices 202, 204, 206 and/or servers 212, 220 may be an assembly of hardware 600 including, for example, a data communication interface 660 for packet data communication. The platform may also include a central processing unit (CPU) 620, in the form of one or more processors, for executing program instructions. The platform typically includes an internal communication bus 610, program storage, and data storage for various data files to be processed and/or communicated by the platform such as ROM 630 and RAM 640, although the system 600 often receives programming and data via network communications 670. The server 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed sharing application, methods, devices, and systems are described with exemplary reference to mobile applications and to transmitting HTTP data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol that is equivalent or successor to HTTP.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for distributing network traffic received from a plurality of client devices and bound toward a plurality of servers sharing a common network address, the method comprising:
   receiving network traffic from the plurality of client devices, the network traffic being addressed to a predetermined network address associated with a plurality of servers;
   parsing respective network addresses associated with the plurality of client devices to determine a subset of bits that have a greatest randomness and have a lowest correlation with other bits;
   separating the received network traffic into assigned buckets based on the determined subset of bits of a respective source network address associated with each unit of traffic; and
   forwarding the received traffic to one of a plurality of servers associated with the predetermined network address, based on the bucket assigned.

2. The method of claim 1, further comprising:
   creating a netmask based on the determined subset of bits, and mapping each source network address to one of the buckets using the netmask.

3. The method of claim 1, further comprising:
   creating an assigned bucket for each of a plurality of possible combinations of the subset of bits, and assigning each bucket to one of the plurality of servers associated with the predetermined network address.

4. The method of claim 2, further comprising:
   assigning each bucket to one of the plurality of servers associated with the predetermined network address.

5. The method of claim 2, wherein:
   each source network address is mapped to one of the buckets by performing a bitwise AND function on the source network address and the netmask; and
   each bucket is defined by either a selection of bits of a network, IPv4, or IPv6 address generated from the bitwise AND of the source network address and the netmask.

6. The method of claim 1, further comprising:
   maintaining a switching layer for separating the received network traffic into assigned buckets; and
   maintaining the plurality of servers for receiving the separated network traffic based on the bucket assigned.

7. The method of claim 1, wherein each bucket is assigned to one of the plurality of servers associated with the predetermined network address, by performing a round robin assignment of buckets to servers.

8. The method of claim 7, wherein each bucket is assigned to one of the plurality of servers associated with the predetermined network address, by assigning each bucket to an integer in a hash space and assigning each server to an integer in the hash space.

9. The method of claim 8, wherein each bucket is assigned to an integer by performing a hash of a netmask or unique bucket ID of the bucket; and each server is assigned to an integer in by performing a hash of a unique ID of the server.

10. A system for distributing network traffic received from a plurality of client devices and bound toward a plurality of servers sharing a common network address, the system including:
    a data storage device storing instructions for distributing network traffic received from a plurality of client devices and bound toward a plurality of servers sharing a common network address;
    a processor configured to execute the instructions to perform a method comprising:
    receiving network traffic from the plurality of client devices, the network traffic being addressed to a predetermined network address associated with a plurality of servers;
    parsing respective network addresses associated with the plurality of client devices to determine a subset of bits that have a greatest randomness and have a lowest correlation with other bits;
    separating the received network traffic into assigned buckets based on the determined subset of bits of a respective source network address associated with each unit of traffic; and
    forwarding the received traffic to one of a plurality of servers associated with the predetermined network address, based on the bucket assigned.

11. The system of claim 10, wherein the processor is further configured for:
creating a netmask based on the determined subset of bits, and mapping each source network address to one of the buckets using the netmask.

12. The system of claim 10, wherein the processor is further configured for:
creating an assigned bucket for each of a plurality of possible combinations of the subset of bits, and assigning each bucket to one of the plurality of servers associated with the predetermined network address.

13. The system of claim 11, wherein the processor is further configured for:
assigning each bucket to one of the plurality of servers associated with the predetermined network address.

14. The system of claim 11, wherein:
each source network address is mapped to one of the buckets by performing a bitwise AND function on the source network address and the netmask; and
each bucket is defined by either a selection of bits of a network, IPv4, or IPv6 address generated from the bitwise AND of the source network address and the netmask.

15. The system of claim 10, wherein the processor is further configured for:
maintaining a switching layer for separating the received network traffic into assigned buckets; and
maintaining the plurality of servers for receiving the separated network traffic based on the bucket assigned.

16. The system of claim 10, wherein each bucket is assigned to one of the plurality of servers associated with the predetermined network address, by performing a round robin assignment of buckets to servers.

17. The system of claim 16, wherein each bucket is assigned to one of the plurality of servers associated with the predetermined network address, by assigning each bucket to an integer in a hash space and assigning each server to an integer in the hash space.

18. A non-transitory computer readable medium storing instructions that, when executed by a computer, cause the computer to perform a method of distributing network traffic received from a plurality of client devices and bound toward a plurality of servers sharing a common network address, the method comprising:
parsing respective network addresses associated with the plurality of client devices to determine a subset of bits that have a greatest randomness and have a lowest correlation with other bits;
receiving network traffic from the plurality of client devices, the network traffic being addressed to a predetermined network address associated with a plurality of servers;
separating the received network traffic into assigned buckets based on the determined subset of bits of a respective source network address associated with each unit of traffic; and
forwarding the received traffic to one of a plurality of servers associated with the predetermined network address, based on the bucket assigned.

* * * * *